United States Patent
Khattar (10) Patent No.: US 8,543,830 B1
(45) Date of Patent: Sep. 24, 2013

(54) METHOD AND APPARATUS FOR CONNECTING TO A SECURITY TOKEN WITHOUT RESTARTING AN APPLICATION

(75) Inventor: Kapil Khattar, New Delhi (IN)

(73) Assignee: Adobe Systems Incorporated, San Jose, CA (US)

( * ) Notice: Subject to any disclaimer, the term of this patent is extended or adjusted under 35 U.S.C. 154(b) by 217 days.

(21) Appl. No.: 13/149,329

(22) Filed: May 31, 2011

(51) Int. Cl.
*G06F 21/00* (2013.01)

(52) U.S. Cl.
USPC .......................................................... 713/185

(58) Field of Classification Search
None
See application file for complete search history.

(56) References Cited

U.S. PATENT DOCUMENTS

| 7,107,293 | B2 | 9/2006 | Booz et al. |
| 7,278,582 | B1 | 10/2007 | Siegel et al. |
| 8,438,319 | B1 * | 5/2013 | Edney ............................ 710/17 |
| 2003/0154375 | A1 | 8/2003 | Yang |
| 2005/0021613 | A1 * | 1/2005 | Schmeidler et al. .......... 709/203 |

* cited by examiner

*Primary Examiner* — Brandon Hoffman
(74) *Attorney, Agent, or Firm* — Moser Taboada (57) ABSTRACT

A method and apparatus for reconnecting a security token without restarting an application that supports use of the security token. In some embodiments, the method establishes at least one session for an application with a security token that is used to authenticate application data associated with the application, creates dynamic session data including cryptographic information associated with the security token, detects an occurrence of the security token being disconnected and, upon detecting the occurrence, terminates all established sessions and deleting the cryptographic information from the dynamic session data.

16 Claims, 5 Drawing Sheets

METHOD AND APPARATUS FOR CONNECTING TO A SECURITY TOKEN WITHOUT RESTARTING AN APPLICATION

BACKGROUND

1. Technical Field

Embodiments of the present application generally relate to secure data transaction systems and, in particular, to a method and apparatus for connecting to a security token without restarting an application.

2. Description of the Related Art

Various types of security information may be used to verify a user with certain computer systems and authenticate user-related data. The security information may be provided to a computer system using cryptographic information (e.g., keys, security certificates, personal information and/or the like) along with cryptographic functions to create secure sessions on the computer system.

Certain devices store crypto-keys and implement the cryptographic functions. These devices are referred to as security tokens and may include hardware security modules (HSM) to retain the security token. The security tokens are often supplied with a native implementation of a cryptographic standard (e.g., PKCS#11: Cryptographic Token Interface Standard by RSA Laboratories). Applications that utilize the cryptographic functions dynamically link to a library (i.e., a PKCS#11 library) that handles communication between the security token and the computer.

Software applications (e.g., ADOBE Acrobat and Live-Cycle) support various security tokens, (e.g., PKCS#11 compliant devices, such as hardware security modules (HSM)) for signing digital documents. These security devices include USB or PCI based dedicated devices. Accordingly, the USB security devices can be removed from a slot and another device reinserted in a same or different slot. Standard Java-based providers executing a Java Virtual Machine to support the Java Cryptography Extension and operating the PKCS#11 compliant devices are unable to reconnect to these security devices after the device is brought down and up again (i.e., a security token reinsertion), which causes session invalidation and requires the Java Virtual Machine to be restarted in order to reconnect the device. Thus, each time a security device is removed and reinserted, the program handling the security token processing must be restarted.

Therefore, there is a need in the art for a method and apparatus for re-connecting a security token after a disconnection without restarting an application that supports the use of the security token.

SUMMARY

Various embodiments of the present application generally comprise a method and apparatus for connecting to a security token without restarting an application that supports use of the security token. In some embodiments, the method establishes at least one session for an application with a security token that is used to authenticate application data associated with the application, creates dynamic session data including cryptographic information associated with the security token, detects an occurrence of the security token being disconnected and, upon detecting the occurrence, terminates all established sessions and deleting the cryptographic information from the dynamic session data

While the method and apparatus for connecting to a security token without restarting an application is described herein by way of example for several embodiments and illustrative drawings, those skilled in the art will recognize that the method and apparatus for method and apparatus for connecting to a security token without restarting an application is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for partial encryption of frame-based electronic content as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a method and apparatus for connecting to a security token without restarting an application are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Embodiments of the invention enable a security token to be disconnected and then reconnected to a user device without restarting an application that supports use of the token. Upon initial use of an application and its security token, a detection module creates dynamic session data. The detection module facilitates terminating a session when the security token is disconnected and beginning a new session when the security token is re-connected. The use of dynamic session data ensures the new session can be established without restarting the application, i.e., embodiments of the invention delete stale session data upon security token disconnection and create new session data upon security token reconnection.

Figure 1:
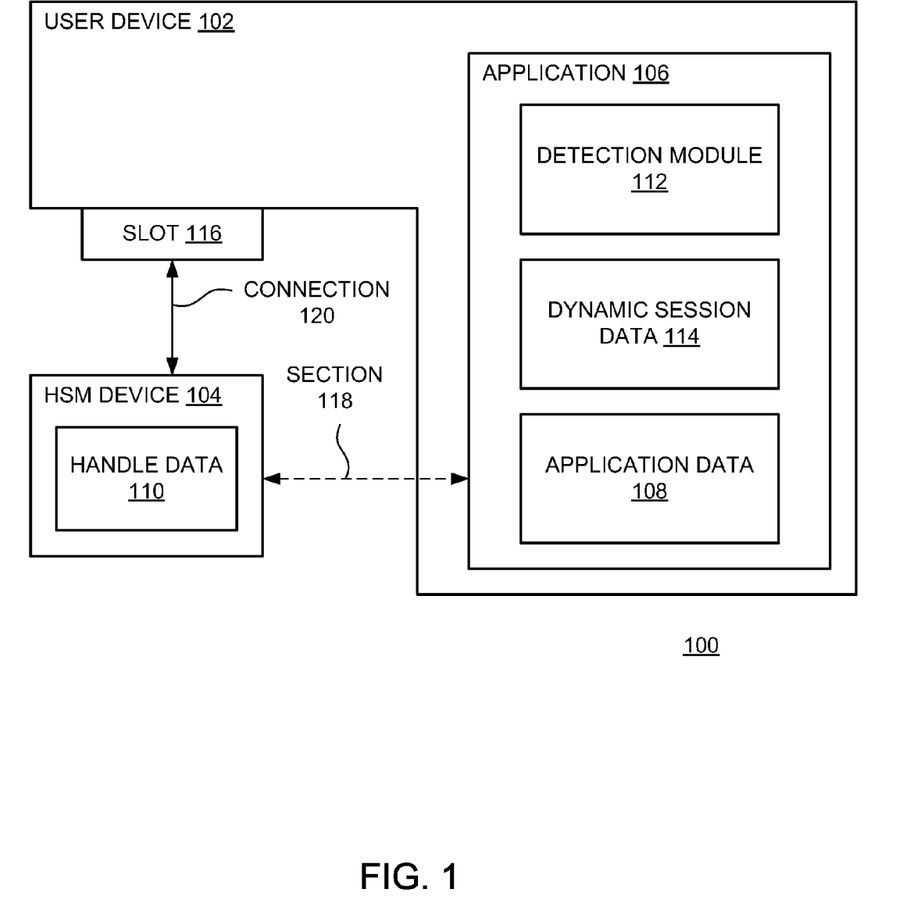
FIG. 1 is a functional block diagram of an apparatus for connecting to a security token without restarting an application according to various embodiments.

FIG. 1 is a functional block diagram of an apparatus 100 comprising a user device 102 and a security token 104 according to various embodiments. The user device 102 is a type of computerized device (e.g., a laptop computer, a desktop computer, a Personal Digital Assistant (PDA), tablet computer, server, a mobile phone and/or the like). The user device 102 executes the application 106, where the application 106 requires security information to operate. In some embodiments, the user device 102 is coupled (e.g., connected) to the security token 104.

In some embodiments, the security token 104 may be incorporated into a physical device, such as a hardware security module (HSM) device (e.g., a smart card, a hardware authenticator and/or the like), or a logical device, such as a software security token. The security token 104 functions as a repository for keys (i.e., a keystore) that are used by the application 106 to perform cryptographic functions, such as authenticating various application data 108 (e.g., signing digital documents). Generally, each key within the security token may be addressed using a handle (e.g., an address) that is stored in handle data 110 and includes a data sequence for authenticating the application data 108.

The application 106 includes a detection module 112 for identifying connections (including reconnections) and disconnections with the security token 104. For example, the detection module 112 identifies a reinsertion of the security token 104 into the user device 102. The detection module 112 also identifies a slot 116 for accessing the security token 104. As illustrated, the slot 116 is an interface associated with the user device 102. Once the security token 104 is inserted into the slot 116, a connection 118 is established between the security token 104 and the application 106.

The dynamic session data 114 stores information associated with one or more sessions established between the security token 104 and the application 106. For example, the dynamic session data 114 includes the handle data 110 (e.g., address) for each object, such as a security certificate (e.g., X 3.509 certificates), a key (e.g., a public key, a secret key, a private key and/or the like). The dynamic session data 114 also includes various identifiers, such as a name and/or an index, for the slot 116. For example, the dynamic session data 114 may assign a name "slot0" and/or an index of "0" to the slot 116 that connects the security token 104 to the user device 102. The detection module 112 communicates authentication requests to the security token 104 using the slot identifiers.

The handle data 110 may include a session handle, which is a value that identifies a particular session. The value may be assigned by a native library (e.g., a shared or dynamic link library) of modules implementing a particular cryptographic standard (e.g., PKCS#11). The application 106 and/or the native library may utilize such value when performing various operations, such as authenticating application data, on the particular session. Each and every thread (i.e., a thread of execution) that is created by the application 106 may access each and every session associated with the slot 116 via the session handles. The library of modules also provides an interface between the application 106 and the security token 104 through a number of slots, such as the slot 116. The security token 104 is inserted into the slot 116 of the user device 102 for the purpose of forming a connection 120 with the user device 102 and establishing the sessions 118 with the application 106. While the connection 120 represents a physical connection between the security token 104 and the application 106, the sessions 118 represent logical connections with the application 106.

The dynamic session data 114 includes handles for various types of objects, such as data, certificates, and keys, that are stored in the security token 104. A data object is defined by the application 106. A certificate object stores a certificate. A key object stores a cryptographic key, such as a public key, a private key, a secret key as well as any subtypes. Objects are also classified according to lifetime and visibility. Token objects, for example, are visible to any application, such as the application 106, that is connected to the security token 104 and have sufficient permission. The token objects remain associated with the security token 104 even after the sessions 118 are closed and the security token 104 is disconnected (e.g., removed) from the slot 116. Session objects are temporarily stored in the dynamic session data 114. Whenever a session is closed by any means, all session objects created by that session are automatically destroyed. In some embodiments, the session objects are only visible to the application 106 if they were created by the application 106.

The application 106 is not required to provide login information (e.g., a username and password) to acquire access to public objects. However, in order to view private objects, the application 106 authenticates the user with the security token 104 using a personal identification number (PIN) or some other token-dependent method (e.g., a thumb print provided to a biometric device).

The security token 104 includes internal software code (e.g., firmware) for creating, destroy and manipulating objects as well as searching for certain objects. The security token 104 may also perform cryptographic functions with the objects. In some embodiments, the security token 104 may include fixed memory locations for keys and instructions for executing a limited set of operations. The security token 104 uses the library to interface with the application 106. As such, the application 106 calls library functions when creating and/ or destroying objects.

The application 106 opens one or more sessions 118 with the security token 104 in order to access stored objects and cryptographic functions. Each of the sessions 118 is represented as a logical connection between the application 106 and the security token 104. It is appreciated that various embodiments of the present disclosure may include only one session instance. For each session type, the application 106 can create, read, write and destroy session objects, and read token objects. However, only in a read/write session can an application create, modify, and destroy token objects. After opening a particular one of the sessions 118, the application 106 has access to public objects within the security token 104. To gain access to private objects, the user must log into the security token 104 via the application 106 and be authenticated. When the particular one of sessions 118 is closed, any session objects that were created in such a session are destroyed including session objects that are being used by other sessions. In some embodiments, the application 106 may also open the sessions 118 on multiple security tokens.

When the security token 104 is removed from the slot 116, the application 106 cannot perform any operation and an error message (i.e., an exception) is generated. When the security token 104 is reinserted, the detection module 112 uses the dynamic session data 114 to terminate any existing sessions without restarting the application 106. In some embodiments, the detection module 112 deletes data stored in the dynamic session data 114 (e.g., session objects), closes the sessions 118 and finalizes a library implementing various cryptographic functions that process cryptographic information stored in the security token 104.

Then, the detection module 112 establishes a new session to connect with the security token 104. To the application 106, the session used to access the security token 104 is stateless. By storing keys and other cryptographic information in the dynamic session data, the detection module 112 avoids storing any transient or static session data. A key object used for digital signing carry the handle data 110 corresponding to an associated key on the security token 104 and does not include a session handle. Hence, a key recovered from one of the sessions 118 may be utilized for authenticating data with any other one of the session 118, which renders the sessions 118 stateless according to some embodiments.

Figure 2:
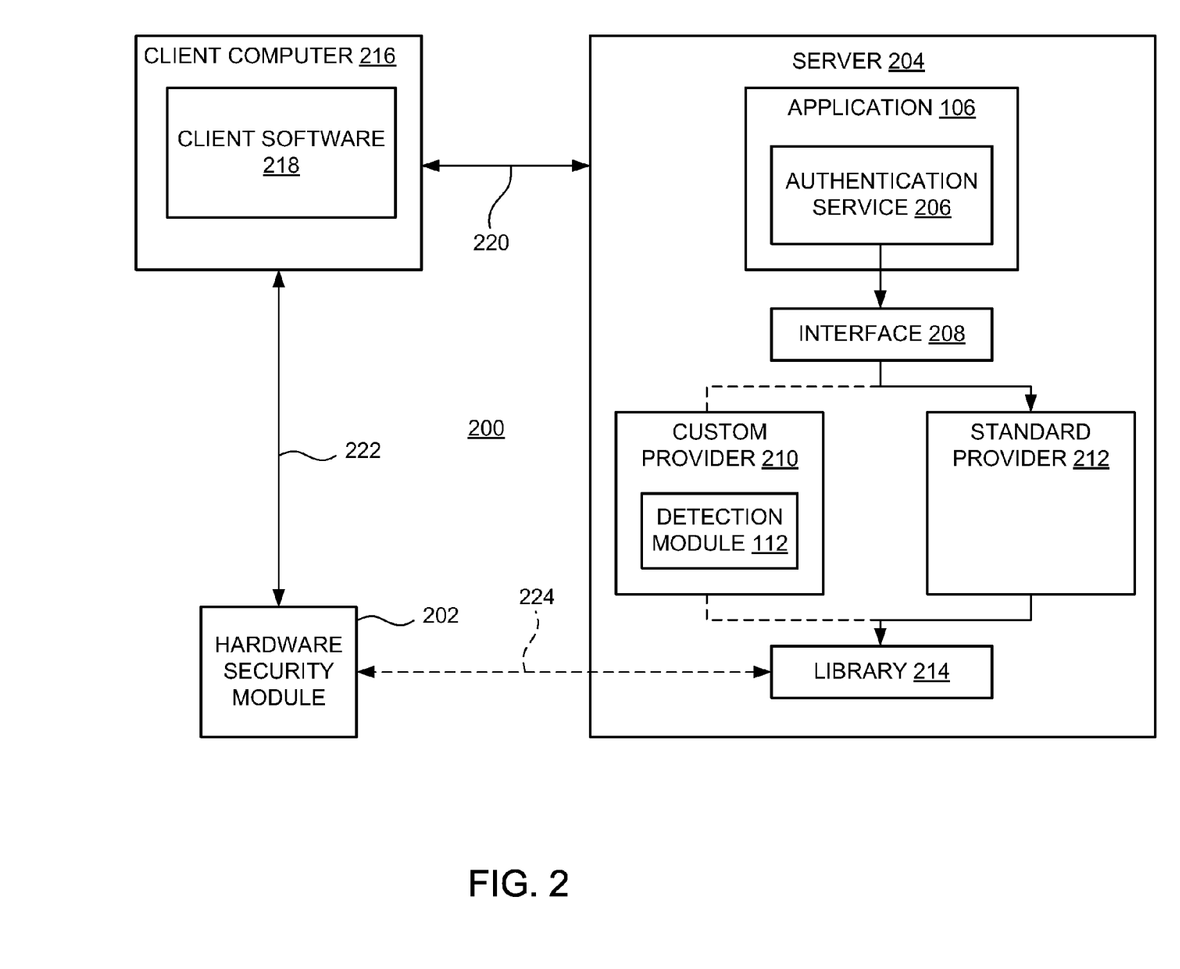
FIG. 2 is a functional block diagram of apparatus representing a server-based implementation of the functional block diagram of FIG. 1.

FIG. 2 is a functional block diagram of an apparatus 200 representing a server-based implementation of the functional block diagram of FIG. 1 according to various embodiments. The apparatus 200 comprises a server 204, a client computer 216 and a hardware security module (HSM) 202. The client computer 216 communicates with the server 204 via a communications path 220, e.g., network, USB cable, fiber optic cable, and the like. The HSM 202 couples to the client computer via path 222, e.g., a slot. The client computer 216 comprises client software that facilitates communication of security token information from the HSM 202 to the server 204 as described below. In this embodiment, the server 204 hosts the application 106 such that the client computer 216 and HSM 202 may be remote from the server 204 but still utilize embodiments of the invention.

In some embodiments, the client software 218 is built using a software development kit (e.g., a collection of software tools for creating applications that interact with a platform or framework, such as the software development kit for ADOBE® LiveCycle). For example, the software development kit includes various header files, type libraries, simple utilities, software code and/or documentation that facilitate the creation of custom software. Hence, the client software 218 may be a custom implementation of various functions that are defined by the software development kit.

Specifically, the server 204 comprises the application 106, an interface 208, a custom provider 210, and a standard provider 212 and a library 214. In operation, the client software 218 exchanges various data with the application 106 according to some embodiments. Specifically, the client software 108 invokes an authentication service 206 of the application 106, which communicates data (e.g., documents) via an interface 208 to a custom provider 210 and/or a standard provider 212, which perform various cryptographic functions using cryptographic information stored within the HSM 202. Authentication requires the execution of the various encryption functions that are accessed via the interface 208. The interface 208 may define and support the various cryptographic functions as well as various objects for which providers, such as the custom provider 210 and the standard provider 212, supply implementations in the form of software code (e.g., processor-executable instructions). In some embodiments, the interface 208 defines software classes and interfaces for the various cryptographic functions, which perform operations involving encryption, key generation and key agreement, and Message Authentication Code (MAC) generation. Accordingly, the authentication service 206 may use the custom provider 210 to invoke a different implementation of an encryption operation that is also implemented in the standard provider 212.

In some embodiments, the custom provider 210 and the standard provider 212 implement a Java Cryptography Extension (JCE) specification as stored in the interface 218 and described in detail in the present disclosure. Each refers to a cryptographic service provider (e.g., a software package or set of software packages that implement one or more cryptographic services, such as digital signature algorithms, message digest algorithms, and key conversion services). The application 106 may request a particular type of object (e.g., a signature object) implementing a particular service (e.g., a DSA signature algorithm), such that the interface 208 returns an implementation from the custom provider 210 and/or the standard provider 212. The application 106 may instead request an implementation from a specific provider, such as the custom provider 210, for re-connecting the HSM 202 without restarting the application 106.

While the custom provider 210 detects security token reinsertion, the standard provider 212 only executes a Java Virtual Machine supplied JCE implementation of PKCS#11 cryptographic operations. Because a vendor for the HSM 202 provides the library 214 implementing PKCS#11 cryptographic operations, the custom provider 210 implements cryptographic functions that invokes the PKCS#11 operations in order to create dynamic session data and maintain stateless sessions.

The library 214 provides a logical connection 224 (e.g., an interface) to the HSM 202 via the client computer 216. Once the HSM 202 is inserted into the slot, the HSM 202 is present and ready to enable functionality over a keystore. Since the library 214 provides a logical view of the slots and the security tokens, it is appreciated that other physical configurations are envisioned in accordance with the present disclosure. For example, multiple slots may share the same physical reader.

In order to continue use of the application 106 without restarting, the custom provider 210 deletes (e.g., flushes) the session pool and terminates (e.g., finalizes) the instance of the library 214, which terminates the session as well. As such, reconnection of the HSM 202 invokes a new session without restarting the application 106.

The HSM 202 is a device that stores cryptographic information (e.g., objects) and can perform various cryptographic operations. The library 214 defines a number of classes of objects: data, certificates, keys and/or the like. A data object is defined by an application. A certificate object stores a certificate. A key object stores a cryptographic key. The key may be a public key, a private key, or a secret key; each of these types of keys has subtypes for use in specific mechanisms. Token objects are visible to all applications connected to the HSM 202 that have sufficient permission, and remain on the HSM 202 even after the sessions are closed and the HSM 202 is removed from its slot.

The HSM 202 can perform some cryptographic operations, following a certain native commands, which are typically passed through standard device drivers, such as PCMCIA card services or socket services. The library 214 presents the HSM 202 to the application 106 as a cryptographic device that is accessed logically in a similar manner as any another device. Thus, the application 106 does not interface directly with the device drivers (or even know which ones are involved) because the library 214 serves as the interface. Indeed, in one example embodiment, the cryptographic device may be implemented entirely in software (e.g., as a process running on the server 204).

Figure 3:
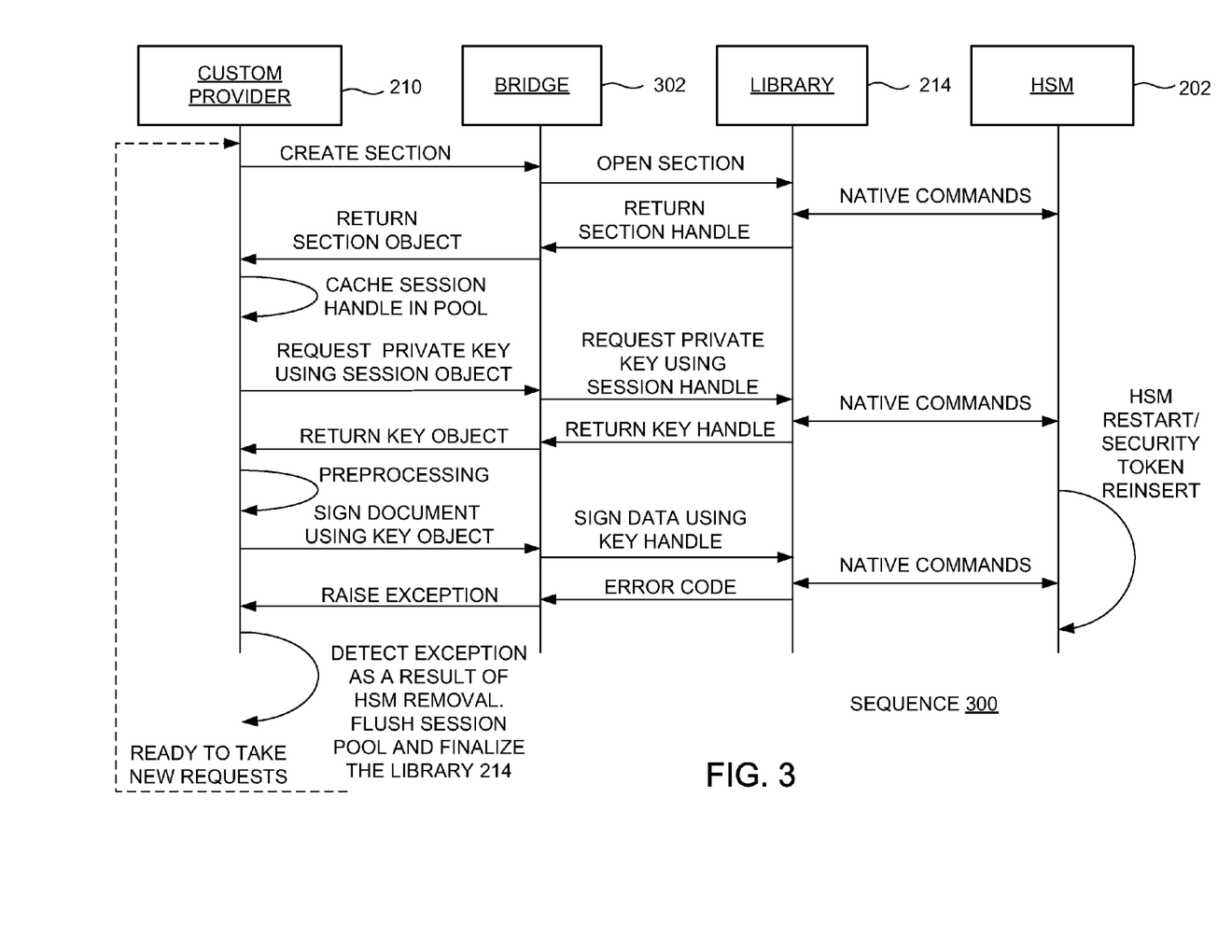
FIG. 3 is a sequence diagram of detection process for the hardware security module using the apparatus of FIG. 1 or 2 according to various embodiments.

FIG. 3 is a sequence diagram of detection process 300 for the hardware security module 202 using the apparatus of FIG. 1 or 2 according to various embodiments. While authenticating data for a user, the detection module 112 detects security token reinsertion or reset as described further below.

The custom provider 210 (e.g., a custom PKCS #11 JCE provider) calls a custom create session function as defined in a bridge 302 (e.g., a JNI bridge, such as an IAIK PKCS #11 Toolkit). The custom provider 210 implements a create session function that, in turn, calls a security token-specific create session function that establishes the session with the HSM 202 via a native protocol. The HSM 202 returns a session handle (e.g., the handle data 110 of FIG. 1) that identifies a location of corresponding cryptographic information (e.g., a private key), which is stored as dynamic session data (e.g., the dynamic session data 114 of FIG. 1) by the custom provider 210 as well as any other information regarding the established session. For example, the custom provider 210 executes a function for caching a session pool that includes the dynamic session data. Using the session handle, the custom provider 210 queries the HSM 202 for an appropriate private key object. Once received, the custom provider 210 uses the private key object to authenticate data (e.g., sign electronic documents).

In response to the HSM 202 disconnection, the HSM 202 signals an error (e.g., raises a Java exception) because the session is invalid. Because the custom provider 210 cannot authenticate any data without the private key object, the existing session must be terminated by deleting any cryptographic information stored in the dynamic session data (e.g., session objects, token objects, data objects and/or the like). Subsequently, the custom provider 210 destroys an instance of the library 214 by calling a finalize function associated with the bridge 302. When the HSM 202 is reinserted or another security token becomes physically connected, the custom provider 210 establishes a new session by creating another set of the dynamic session data.

In some embodiments, the new session corresponds with same or similar cryptographic information as the previous session between the HSM 202 and the application 106. Hence, the new session is essentially stateless because the application 106 may continue processing authentication requests using the same cryptographic information via the client software 218. The same slot used for coupling the HSM 202 may be reused. Since a new instance of the library 214 is created, the new session is not confused with the previous session and therefore treated as a valid session. Similarly, if a different security token, such as another hardware security module, is connected with the server 204, the new session may reuse the slot.

Figure 4:
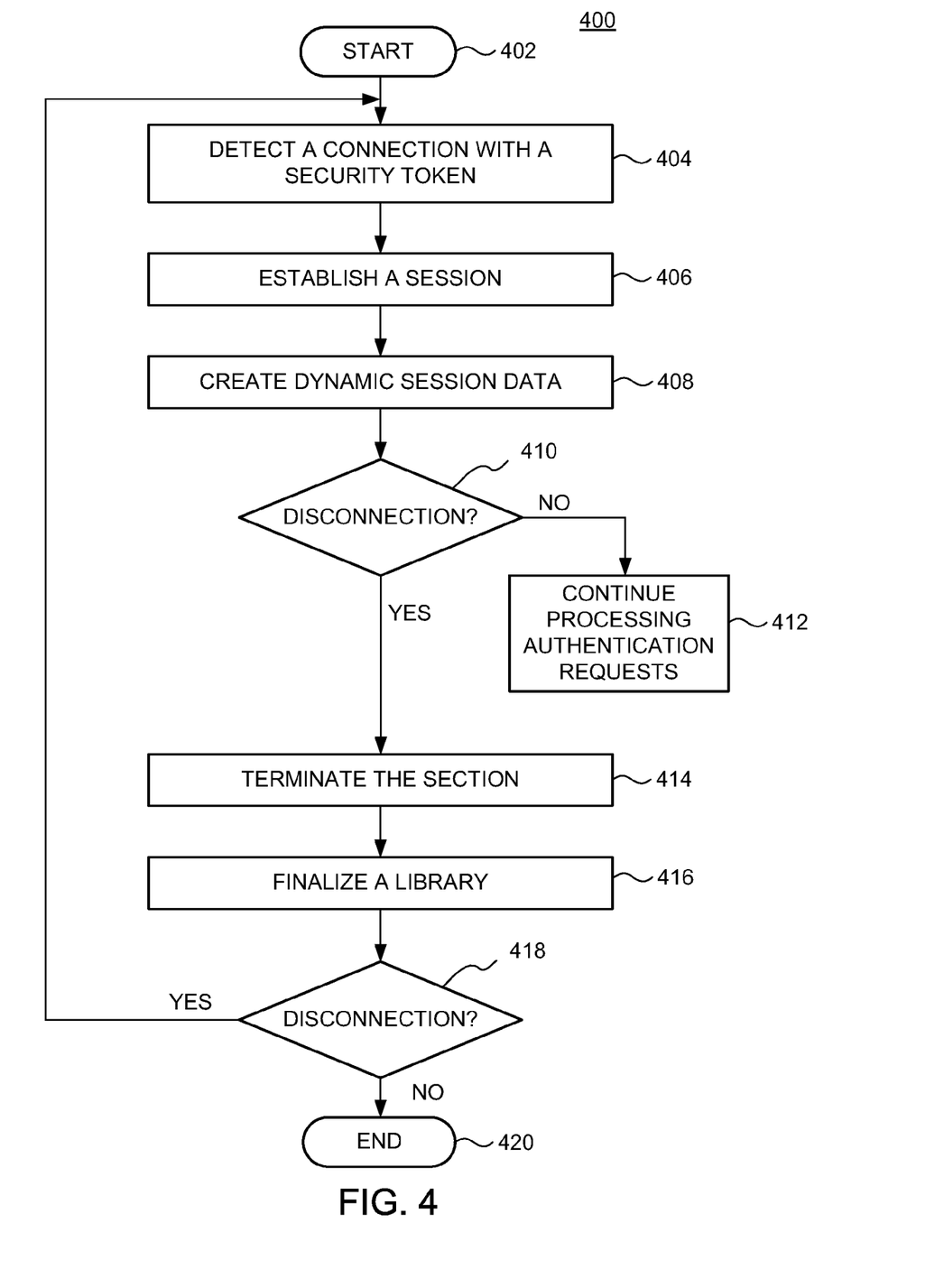
FIG. 4 is a flow diagram of a method for connecting to a security token using the apparatus of FIG. 1 or 2 according to various embodiments.

FIG. 4 is a flow diagram of a method for reconnecting a hardware security module without restarting an application using apparatus of FIG. 1 or 2 according to various embodiments.

In some embodiments, each and every step of the method 400 is performed by a detection module (e.g., the detection module 114 of FIG. 1). In other embodiments, one or more steps are skipped or omitted. The detection module may form a portion of a custom provider (e.g., the custom provider 210 of FIG. 2) implementing the Java Cryptography Extension for the purpose of detecting a disconnection of a security token from a slot coupled to a computer. The method 400 starts at step 402 and proceeds to step 404.

At step 404, the method 400 detects a connection with a security token. At step 406, the method 400 establishes a session. As described above, the method 400 invokes various function calls associated with a cryptographic library (e.g., the library 214 of FIG. 2) for creating a session between an application (e.g., the application 106 of FIG. 1) and the security token. In some embodiments, a JNI bridge (e.g., the bridge 302 of FIG. 3) converts these function calls, which are organized in Java, into a valid function calls in a C programming language format. If the cryptographic library implements a Cryptographic Standard (e.g., PKCS#11: Cryptographic Token Interface Standard) in C, then corresponding function calls are also in C.

At step 408, the method 400 creates dynamic session data comprising various objects, such as session objects. In some embodiments, the method 400 caches the session by storing the dynamic session data in a pool. Because the dynamic session data is not created or accessed by the library 214, the method 400 may use the session object in the future to reconnect the security token if disconnected. At step 410, the method 400 determines whether the security token became disconnected from a computer, such as a user device or a remote computer running the application. If the method 400 detects a lack of a connection (e.g., the connection 120 of FIG. 1), then the security token is disconnected and the method 400 proceeds to step 414. A lack of connection can be determined through monitoring conduction to the token, receiving no signaling from the token, and the like. If, on the other hand, the security token is still connected, the method 400 proceeds to step 412. At step 412, the method 400 continues processing authentication requests.

When the method 400 detects a subsequent disconnection of the security token, the method 400 terminates the session at step 414. At step 416, the method 400 finalizes the cryptographic library and creates another instance of the same. As explained in the present disclosure, the method 400 deletes the dynamic session data as well as the instance of the cryptographic library. As such, the session may be reestablished upon reinsertion of the security token. At step 418, the method 400 determines whether the security token became reconnected to the computer. Alternatively, the method 400 determines whether another security token connected to the computer instead. In either embodiment, a same or different slot (e.g., the slot 116 of FIG. 1) may be used. If the method 400 detects the security token or the other security token, the method 400 returns to step 404. Otherwise, the method 400 proceeds to step 420 where the method 400 ends. Alternatively, the method 400 waits for the security token to be reconnected.

Figure 5:
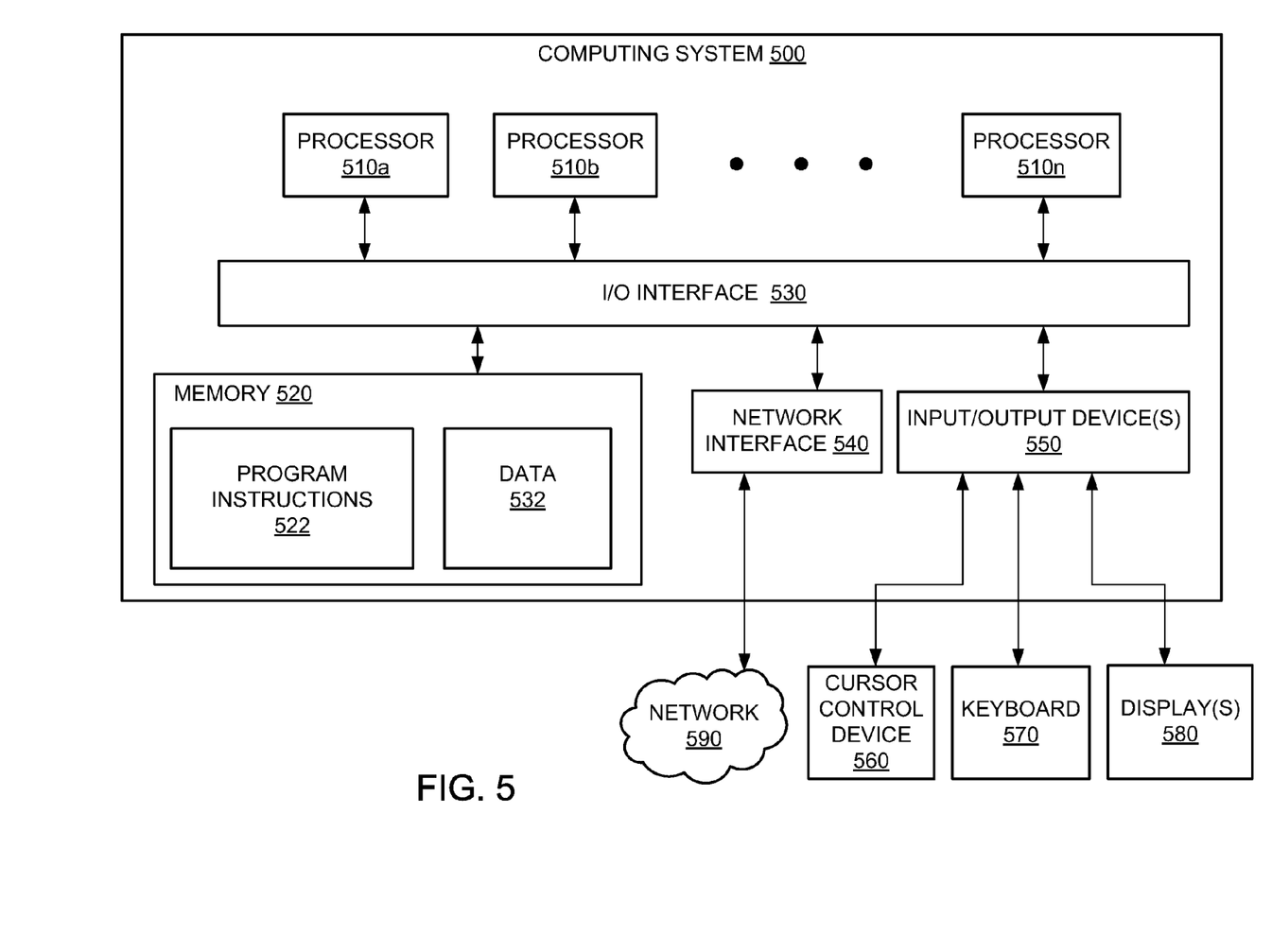
FIG. 5 is a schematic diagram of a computing system that can be used to implement the apparatus of FIG. 1 or 2 according to one or more embodiments.

FIG. 5 is a schematic diagram of a computing system that can be used as an apparatus for reconnecting a hardware security module without restarting an application according to one or more embodiments.

Example Computer System

Various embodiments of a method and apparatus for method and apparatus for connecting to a security token without restarting an application, as described herein, may be executed on one or more computer systems, which may interact with various other devices. One such computer system is computer system 500 illustrated by FIG. 5, which may in various embodiments implement any of the elements or functionality illustrated in FIGS. 1-4. In various embodiments, computer system 500 may be configured to implement the apparatus 100 described above. While the illustrated system demonstrates computer system 500 implementing the apparatus 100, computer system 500 may be used to implement any other system, device, element, functionality or method of the above-described embodiments. In the illustrated embodiments, computer system 500 may be configured to implement the detection module 112 as processor-executable executable program instructions 522 (e.g., program instructions executable by processor(s) 510) in various embodiments. In some embodiments, computer system 500 also implements the application 106, the client software 108, the authentication service 206, the interface 208, the custom provider 210, the standard provider 212, the library 214 and the bridge 302.

In the illustrated embodiment, computer system 500 includes one or more processors 510 coupled to a system memory 520 via an input/output (I/O) interface 530. Computer system 500 further includes a network interface 540 coupled to I/O interface 530, and one or more input/output devices 550, such as cursor control device 560, keyboard 570, and display(s) 580. In various embodiments, any of components 560, 570 and 580 may be utilized by the detection module to receive user input as described above. In various embodiments, a user interface may be generated and displayed on display 580. In some cases, it is contemplated that embodiments may be implemented using a single instance of computer system 500, while in other embodiments multiple such systems, or multiple nodes making up computer system 500, may be configured to host different portions or instances of various embodiments. For example, in one embodiment some elements may be implemented via one or more nodes of computer system 500 that are distinct from those nodes implementing other elements. In another example, multiple nodes may implement computer system 500 in a distributed manner.

In different embodiments, computer system 500 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 500 may be a uniprocessor system including one processor 510, or a multiprocessor system including several processors 510 (e.g., two, four, eight, or another suitable number). Processors 510 may be any suitable processor capable of executing instructions. For example, in various embodiments processors 510 may be general-purpose or embedded processors implementing any of a variety of instruction set architectures (ISAs), such as the x96, PowerPC, SPARC, or MIPS ISAs, or any other suitable ISA. In multiprocessor systems, each of processors 510 may commonly, but not necessarily, implement the same ISA.

System memory 520 may be configured to store program instructions 522 and/or data 532 accessible by processor 510. In some embodiments, system memory 520 stores cryptographic information in the dynamic session data 114 as explained in the present disclosure. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 520. In other embodiments, program instructions and/or data may be received, sent or stored upon different types of computer-accessible media or on similar media separate from system memory 520 or computer system 500.

In one embodiment, I/O interface 550 may be configured to coordinate I/O traffic between processor 510, system memory 520, and any peripheral devices in the device, including network interface 540 or other peripheral interfaces, such as input/output devices 550, In some embodiments, I/O interface 530 may perform any necessary protocol, timing or other data transformations to convert data signals from one components (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

Network interface 540 may be configured to allow data to be exchanged between computer system 500 and other devices attached to a network (e.g., network 540), such as one or more external systems or between nodes of computer system 500. In various embodiments, network 540 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 550 may, in some embodiments, include one or more display terminals, keyboards, keypads, touchpads, scanning devices, voice or optical recognition devices, or any other devices suitable for entering or accessing data by one or more computer systems 500. Multiple input/output devices 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

In some embodiments, the illustrated computer system may implement any of the methods described above, such as the methods illustrated by the flowcharts of FIG. 4. In other embodiments, different elements and data may be included.

Those skilled in the art will appreciate that computer system 500 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

Various elements, devices, modules and circuits are described above in associated with their respective functions. These elements, devices, modules and circuits are considered means for performing their respective functions as described herein.

While the foregoing is directed to embodiments of the present invention, other and further embodiments of the invention may be devised without departing from the basic scope thereof, and the scope thereof is determined by the claims that follow.

The invention claimed is:

1. A computer-implemented method for connecting a security token without restarting an application that supports the use of the security token, comprising:
    establishing at least one session for an operational application with a security token that is used to authenticate application data associated with the application;
    creating dynamic session data comprising cryptographic information associated with the security token;
    detecting an occurrence of the security token being disconnected, while the application remains operational;
    upon the occurrence, terminating all established sessions and deleting the cryptographic information from the dynamic session data, while the application remains operational;
    detecting a reconnection of a security token to the application, while the application remains operational; and
    upon reconnection of the security token, establishing a new session between the application and the security token, without restarting the application.

2. The method of claim 1, wherein the at least one session is stateless.

3. The method of claim 1, wherein the dynamic session data is stored in a remote computer that comprises the application that is remote from the security token.

4. The method of claim 1, wherein security token comprises at least one of a hardware security module or a software security token.

5. The method of claim 1, wherein the security token further comprises a hardware security module that is disconnected from a slot, wherein the slot is accessed by the application.

6. The method of claim 1 further comprising establishing a new session with the application when the security token is reconnected.

7. The method of claim 1 further comprising after the security token disconnects from the application, establishing a new session between the application and at least one of another security token or the security token.

8. The method of claim 1, wherein terminating the session further comprises finalizing a library implementing cryptographic functions for processing the cryptographic information.

9. The method of claim 1 further comprising reusing a slot that is reconnected to the security token and is accessed by the application.

10. An apparatus for connecting a security token without restarting an application that supports the use of the security token, comprising:
    a detection module for establishing at least one session for an application with a security token that is used authenticate application data associated with the application, creating dynamic session data comprising cryptographic information associated with the security token; detecting an occurrence of the security token being disconnected, while the application remains operational; upon detecting the occurrence, terminating all established sessions and deleting the cryptographic information from the dynamic session data, while the application remains operational, and upon identifying a reinsertion of the security token, establishes a new session between the application and the security token, without restarting the application.

11. The apparatus of claim 10, wherein the security token is inserted in a security device that is remotely located from the detection module.

12. The apparatus of claim 10, wherein security token comprises at least one of a hardware security module or a software security token.

13. The apparatus of claim 10, wherein the security token further comprises a hardware security module that is disconnected from a slot, wherein the slot is accessed by the application.

14. The apparatus of claim 10, wherein the detection module establishes a new session between the application and at least one of another security token or the security token after the security token reconnects to the detection module.

15. The apparatus of claim 10, wherein, upon security token disconnection, the detection module finalizes a library implementing cryptographic functions for processing the cryptographic information.

16. A non-transitory computer readable medium for storing processor executable instructions that, when executed by a computing system, causes the computing system to perform a method for connecting a security token without restarting an application that supports the use of the security token, comprising:

establishing at least one session for an application with a security token that is used to authenticate application data associated with the application;

creating dynamic session data comprising cryptographic information associated with the security token;

detecting an occurrence of the security token being disconnected, while the application remains operational;

upon detection of the occurrence, terminating all established sessions and deleting the cryptographic information from the dynamic session data, while the application remains operational;

identifying a reconnection of the security token to the application, while the application remains operational; and upon reconnection of the security token, establishing a new session between the application and the security token, without restarting the application.

\* \* \* \* \*